United States Patent
Xu et al.

(10) Patent No.: US 11,029,209 B2
(45) Date of Patent: Jun. 8, 2021

(54) SPECTRAL PHASE INTERFERENCE DEVICE AND SYSTEM

(71) Applicant: SHENZHEN UNIVERSITY, Guangdong (CN)

(72) Inventors: Shixiang Xu, Shenzhen (CN); Shuiqin Zheng, Shenzhen (CN); Yi Cai, Shenzhen (CN); Qinggang Lin, Shenzhen (CN); Huangcheng Shangguan, Shenzhen (CN); Junmin Liu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 322 days.

(21) Appl. No.: 16/304,135

(22) PCT Filed: Jun. 6, 2017

(86) PCT No.: PCT/CN2017/087290
§ 371 (c)(1),
(2) Date: Nov. 22, 2018

(87) PCT Pub. No.: WO2018/196104
PCT Pub. Date: Nov. 1, 2018

(65) Prior Publication Data
US 2020/0319032 A1    Oct. 8, 2020

(30) Foreign Application Priority Data
Apr. 25, 2017    (CN) .......................... 201710277226.X

(51) Int. Cl.
*G01J 3/45*        (2006.01)
*G01J 3/02*        (2006.01)
(Continued)

(52) U.S. Cl.
CPC ................. *G01J 3/45* (2013.01); *G01J 3/021* (2013.01); *G01J 3/0208* (2013.01);
(Continued)

(58) Field of Classification Search
CPC ........ G01J 3/0208; G01J 3/021; G01J 3/0224; G01J 3/14; G01J 3/45; G01J 9/02; G01J 2003/451; G01J 2009/0261; G01J 11/00
See application file for complete search history.

(56) References Cited

U.S. PATENT DOCUMENTS 6,611,336 B1 * 8/2003 Walmsley ................ G01J 11/00
                                                        356/450
6,633,386 B2 * 10/2003 Walmsley ................ G01J 11/00
                                                        356/450
(Continued)

FOREIGN PATENT DOCUMENTS

CN          1936523 A       3/2007
CN        101294850 A      10/2008
(Continued)

OTHER PUBLICATIONS

International Search Report for related application PCT/CN17/87290, dated Jan. 29, 2018; 13 pages.

*Primary Examiner* — Michael A Lyons

(57) ABSTRACT

The present application provides a spectral phase interference device and system for addressing the problem of low stability and compactness with prior art spectral phase interference devices. In the device or system provided in the present application, the optical element for generating the pulse pair to be measured consists of only a birefringent crystal and the adjustment of two-step phase shift is also completed by only a broadband quarter-wave plate. Therefore, wide application of optical elements such as pulse stretchers, retarders, optical splitters and mirrors as in prior art devices is avoided, thereby significantly simplifying the (Continued)

overall device's structure and resulting in enhanced stability and compactness at the same time.

9 Claims, 1 Drawing Sheet

(51) Int. Cl.
  *G01J 3/14* (2006.01)
  *G01J 9/02* (2006.01)
(52) U.S. Cl.
  CPC ............... *G01J 3/0224* (2013.01); *G01J 3/14* (2013.01); *G01J 9/02* (2013.01); *G01J 2003/451* (2013.01); *G01J 2009/0261* (2013.01)

(56) References Cited

U.S. PATENT DOCUMENTS

| | | | |
|---|---|---|---|
| 2006/0033923 | A1 | 2/2006 | Hirasawa et al. |
| 2016/0241759 | A1* | 8/2016 | Xu .......................... H04N 5/247 |

FOREIGN PATENT DOCUMENTS

| | | | |
|---|---|---|---|
| CN | 102175333 | A | 9/2011 |
| CN | 104236726 | A | 12/2014 |
| CN | 10644153 | A | 2/2017 |

* cited by examiner

SPECTRAL PHASE INTERFERENCE DEVICE AND SYSTEM

CROSS-REFERENCE TO RELATED APPLICATIONS

This application is the U.S. national stage of International Patent Application No. PCT/CN2017/087290, filed on Jun. 6, 2017 and entitled SPECTRAL PHASE INTERFERENCE DEVICE AND SYSTEM, which claims the benefit of priority under 35 U.S.C. § 119 from Chinese Patent Application No. 201710277226.X, filed Apr. 25, 2017. The disclosures of the foregoing applications are incorporated herein by reference in their entirety.

TECHNICAL FIELD

The present application pertains to the field of ultra-fast optical technology, and particularly relates to a spectral phase interference device and system.

BACKGROUND

Ultra-short pulse laser technology has been widely applied in fields such as strong field physics, femtosecond chemistry, precision machining and biomedical diagnostics. In the various application fields of the ultra-short laser pulse, diagnosis of the time/spectral characteristics of ultra-short pulse laser is of crucial importance.

Spectral phase interference based on direct electric field (SPIDER) is one of the most common ultra-short pulse laser diagnosis technologies. This technology is capable of measuring the width, shape and phase of a light pulse with the following advantages. The measurement is taken in the spectral field without any fast-response receiver. The device includes no movable elements and hence is stable and reliable. The iterative algorithm is simple which is favorable for high repetition rate real time detection. Subsequently, the appearance of two-step phase shifted SPIDER device enhances in principle the capability of the SPIDER to measure the pulses with complex spectral structures or the pulses with narrow bandwidth to support hundreds of femtoseconds.

At present, a conventional SPIDER device mainly includes four parts: namely a measured pulse pair generator, a pulse disperser, an optical pulse mixer and a spectrometer. In a SPIDER device, the stability of the pulse pair generator and the pulse disperser are of crucial importance. However, conventional SPIDER devices generally have complex configuration, thereby lack of stability and compactness.

SUMMARY

The present application provides a spectral phase interference device and system, for addressing the problem of low stability and compactness for the prior art spectral phase interference devices.

In order to address the above-mentioned technical problems, the present application provides a spectral phase interference device including:

a beam splitter configured to split a pulse to be measured into a reflected pulse and a transmitted pulse, wherein said reflected pulse is incident to a pulse retarder and said transmitted pulse is incident to a pulse disperser;

said pulse disperser is configured to spread said transmitted pulse into a chirped pulse that is incident to a half-wave plate;

said half-wave plate is configured to adjust a polarization direction of said chirped pulse that is incident to a polarizing beam splitter after transmitting through said half-wave plate;

said pulse retarder is configured to delay said reflected pulse, wherein the delayed reflected pulse is incident to a birefringent crystal;

said birefringent crystal is configured to allow said delayed reflected pulse to generate pulse pair to be measured with a relative time delay, wherein said pulse pair to be measured is incident to said broadband quarter-wave plate;

said broadband quarter-wave plate is configured to adjust said pulse pair to be measured to allow relative phases of the two sub-pulses in said pulse pair to be measured to generate phase difference it in the pulse pair to be measured, wherein said pulse pair to be measured that has generated phase difference $\pi$ is incident to a polarizing beam splitter;

said polarizing beam splitter is configured to allow said pulse pair to be measured that has generated phase difference $\pi$ and said chirped pulse that has transmitted through said half-wave plate to be incident to a focusing lens at the same time;

said focusing lens is configured to focus the chirped pulse that transmitted through said half-wave plate and said pulse pair to be measured that has generated the phase difference $\pi$, wherein said focused pulse is incident to a sum-frequency pulse generator;

said sum-frequency pulse generator is configured to subject said focused pulse to sum-frequency conversion to generate a sum-frequency pulse pair that is incident to a spectrometer; and said spectrometer is configured to record spectral interference ring data generated by said sum-frequency pulse pair.

Further, said pulse retarder consists of two 180° catadioptric mirror sets each containing two isosceles right-angle prisms, and said isosceles right-angle prism each has its hypotenuse surface coated with 45° highly reflective coating, wherein in each of said 180° catadioptric mirror sets, one surface adjacent to the right angle of one isosceles right-angle prism and one surface adjacent to the right angle of the other isosceles right-angle prism are attached on the same reference plane, and the hypotenuse surfaces of the two isosceles right-angle prisms are opposed to each other.

Further, an optical axis direction of said birefringent crystal is in the same plane as a transmission direction of said delayed reflected pulse and forms a 45° angle with a polarization direction of said incident delayed reflected pulse, and an incident surface and an exit surface of said birefringent crystal are both coated with antireflection coating.

Further, said broadband quarter-wave plate is a broadband zero-order achromatic wave plate with 45° from its fast and slow axes direction to the polarization direction of the incident pulse pair to be measured.

Further, said pulse disperser consists of a first isosceles right-angle prism and a second isosceles right-angle prism both of which are coated with antireflection coating on their hypotenuse surfaces.

Further, said polarizing beam splitter is a film splitter with a normal line direction being in the same plane as the transmission direction of said incident pulse pair to be measured and being perpendicular to a polarization direction of said incident pulse pair to be measured.

Further, said polarizing beam splitter is specifically configured to reflect sub-pulses with vertical polarization direction in said pulse pair to be measured to the focusing lens, and transmit the chirped pulses that have transmitted through said half-wave plate to said focusing lens.

Further, said spectrometer is configured to record the first spectral interference ring data when the fast axis direction of said broadband quarter-wave plate forms a 45° angle with the polarization direction of said incident pulse pair to be measured; and said spectrometer is configured to record the second spectral interference ring data after rotating the said broadband quarter-wave plate with an angle of 90°.

The present application further provides a spectral phase interference system including the above-described spectral phase interference device.

As compared to prior art, the beneficial effects are as follows.

In the device or system provided in the present application, the optical element for generating the pulse pair to be measured consists of only a pair of birefringent crystal, and the adjustment of two-step phase shift is also achieved by only a broadband quarter-wave plate. Therefore, wide application of optical elements such as pulse stretchers, retarders, optical splitters and mirrors as in prior art devices is avoided, thereby significantly simplifying the device's overall structure and resulting in enhanced stability and compactness at the same time.

DETAILED DESCRIPTION

In order to make the object, technical solution and advantages of the present application clearer, the present application will be further described in detail below with reference to accompanying drawings and embodiments. It should be understood that specific embodiments described herein serve only to explain the present application rather than limiting the present application.

Figure 1:
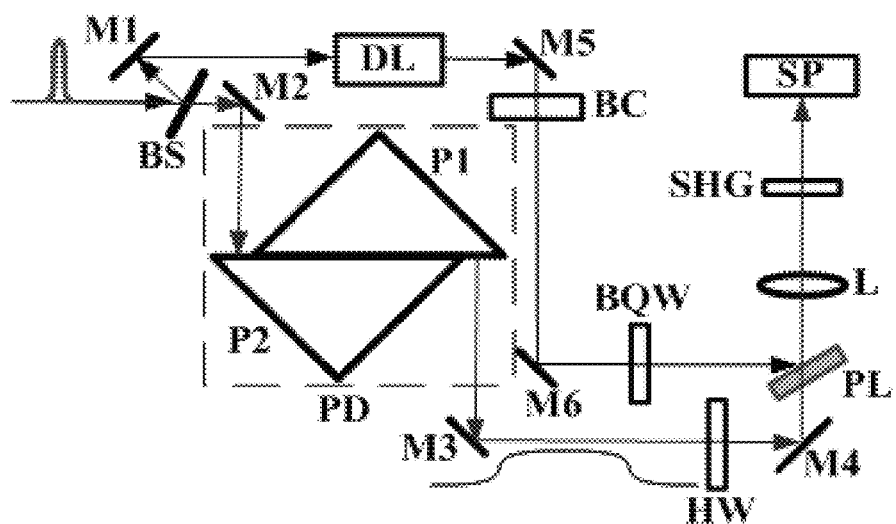
FIG. 1 is a diagram of a spectral phase interference device according to an embodiment of the present application.

The first embodiment of the present application provides a spectral phase interference device including the optical elements shown in FIG. 1. In FIG. 1, BS denotes a beam splitter, DL denotes a pulse retarder, HW denotes a half-wave plate, BQW denotes a broadband quarter-wave plate, BC denotes a birefringent crystal, PL denotes a polarizing beam splitter, PD denotes a pulse disperser, P1 denotes a first isosceles right-angle prism, P2 denotes a second isosceles right-angle prism, L denotes a focusing lens, SHG denotes a sum-frequency pulse generator, SP denotes a spectrometer and M1\M2\M3\M4\M5\M6 all denote mirrors.

The beam splitter BS is configured to split the pulse to be measured into a reflected pulse and a transmitted pulse, wherein said reflected pulse is incident to the pulse retarder DL and said transmitted pulse is incident to the pulse disperser PD.

The pulse disperser PD is configured to spread said transmitted pulse into a chirped pulse that is incident to the half-wave plate HW. The operation principle of the pulse disperser PD is as follows. Dispersion is introduced into said transmitted pulse to change it into a chirped pulse and the time width of the transmitted pulse is spread at the same time.

The half-wave plate HW is configured to adjust the polarization direction of said chirped pulse and the chirped pulse is incident to the polarizing beam splitter through the half-wave plate. In this embodiment, the half-wave plate HW polarizes the chirped pulse in the horizontal direction by rotating the polarization direction of the incident chirped pulse.

The pulse retarder DL is configured to delay said reflected pulse and the delayed reflected pulse is incident to the birefringent crystal BC. The pulse retarder DL mainly functions to adjust the optical path difference between the reflected pulse and the transmitted pulse exiting from the beam splitter BS for reaching the sum-frequency pulse generator SHG The birefringent crystal BC is configured to allow said delayed reflected pulse to generate pulse pair to be measured with relative time delay and said pulse pair to be measured is incident to the broadband quarter-wave plate BQW. The birefringent crystal BC mainly functions to allow normal light and abnormal light transmitted therein to generate time delay, thereby generating the pulse pair to be measured with relative time delay.

The broadband quarter-wave plate BQW is configured to adjust said pulse pair to be measured to allow relative phases of the two sub-pulses in said pulse pair to be measured to generate phase difference in the pulse pair it to be measured, and the pulse pair to be measured that have generated phase difference t is incident to the polarizing beam splitter. In this embodiment, the broadband quarter-wave plate BQW has fast and slow axes directions consistent with that of the birefringent crystal and mainly functions to change phase shift it between the fast light and the slow light exiting from the birefringent crystal.

The polarizing beam splitter PL is configured to allow the pulse pair to be measured which has phase difference t and the chirped pulse that has transmitted through said half-wave plate to be incident to the focusing lens L at the same time.

The focusing lens L is configured to focus the chirped pulse that transmitted said half-wave plate and the pulse pair to be measured that has generated the phase difference $\pi$ and the focused pulse is incident to the sum-frequency pulse generator SHG The sum-frequency pulse generator SHG is configured to subject said focused pulse to sum-frequency conversion to generate the sum-frequency pulse pair that is incident to the spectrometer SP. That is, the sum-frequency pulse generator SHG is configured to subject said focused pulse to sum-frequency conversion to generate the first sum-frequency pulse and the second sum-frequency pulse that are incident to the spectrometer SP. In this embodiment, the sum-frequency pulse generator SHG is a nonlinear mixing crystal.

The spectrometer SP is configured to record the spectral interference ring data generated by said sum-frequency pulse pair. That is, the spectrometer SP is configured to record the spectral interference ring data generated between the incident first sum-frequency pulse and second sum-frequency pulse.

Figure 2:
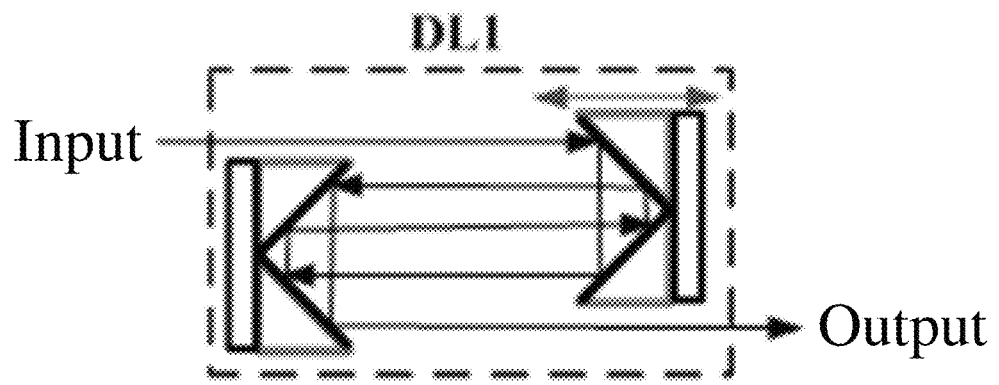
FIG. 2 is a diagram of a pulse retarder according to an embodiment of the present application.

As shown in FIG. 2, the pulse retarder DL consists of two 180° catadioptric mirror sets each containing two isosceles right-angle prisms. The isosceles right-angle prisms have hypotenuse surfaces each coated with 45° highly reflective coating. In each of said 180° catadioptric mirror sets, one surface adjacent to the right angle of one isosceles right-angle prism and one surface adjacent to the right angle of the other isosceles right-angle prism are attached on the same reference plane, and the hypotenuse surfaces of the two isosceles right-angle prisms are opposed. It is to be noted that the pulse retarder DL shown in FIG. 2 provided in the present application not only functions to delay the pulse, but also to turn back the light path multiple times. Therefore, by adjusting one of the two 180° catadioptric mirror sets, it is possible to control the times of turning back light in the direction perpendicular to the incident light easily. That is, the pulse retarder DL can flexibly control the times of multiple turning back of light inside it such that the pulse retarder DL has a more compact structure and has the advantage of flexible adjustment at the same time.

The optical axis direction of the birefringent crystal BC is in the same plane as the transmission direction of said delayed reflected pulse and forms a 45° angle with the polarization direction of said incident delayed reflected pulse. And the incident and exit surfaces of said birefringent crystal BC are both coated with broadband antireflection coating.

The broadband quarter-wave plate BQW is a broadband zero-order de-dispersion wave plate with its fast and slow axes direction forming a 45° angle with the transmission direction of the incident pulse pair to be measured.

The pulse disperser PD consists of a first isosceles right-angle prism P1 and a second isosceles right-angle prism P2 both of which are coated with antireflection coating on their hypotenuse surfaces.

The polarizing beam splitter PL is a film splitter with the normal line direction being in the same plane as the transmission direction of said incident pulse pair to be measured and being perpendicular to the polarization direction of said incident pulse pair to be measured.

In addition, the polarizing beam splitter PL is specifically configured to reflect sub-pulses with vertical polarization direction in said pulse pair to be measured to the focusing lens L and transmit sub-pulses with parallel polarization direction in said pulse pair to be measured to the focusing lens L, and transmit the chirped pulses that have transmitted through said half-wave plate to the focusing lens L.

The spectrometer SP is configured to record the first spectral interference ring data when said broadband quarter-wave plate BQW is adjusted such that the fast axis direction of said broadband quarter-wave plate BQW forms a 45° angle with the polarization direction of said incident pulse pair to be measured; and the spectrometer SP is configured to record the second spectral interference ring data when said broadband quarter-wave plate BQW is adjusted such that the fast axis direction of said broadband quarter-wave plate BQW forms a negative 45° angle with the polarization direction of said incident pulse pair to be measured. The spectrometer SP is further configured to output the first spectral interference ring data and the second spectral interference ring data to the computer terminal for processing respectively. When the spectrometer SP is recording the first spectral interference ring data, it is necessary to adjust the broadband quarter-wave plate BQW such that the fast axis direction of the BQW forms a 45° angle with the polarization direction of the incident light; and then, when the spectrometer SP is recording the second spectral interference ring data, it is necessary to adjust the broadband quarter-wave plate BQW such that the fast axis direction rotates 90° further to form a negative 45° angle with polarization direction of the incident light.

Also, it is to be noted that several mirrors such as M1 to M6 are used in embodiments of the present application for cooperatively functioning in the device, such that pulses are reflected to the respective locations, which will not be described in detail herein.

When the device provided in the present embodiment is measuring, it is assumed that the incident pulses are p polarized, it is sufficient that the fast and slow axes of the half-wave plate HW are parallel to or perpendicular to the polarization direction of the incident light. The fast and slow axes of the birefringent crystal form an approximately 45° angle with the polarization direction of the incident light, respectively, which in turn generates fast and slow lights with equal intensity. When the broadband quarter-wave plate BQW is adjusted such that its fast and slow axes direction is parallel or perpendicular to the fast and slow lights exiting the birefringent crystal, the spectrometer SP records the first spectral interference ring data; and then the broadband quarter-wave plate is rotated by 90°, and the spectrometer SP records the second spectral interference ring data.

The calculation formula for the first spectral interference ring data $D_1$ measured by the spectrometer SP is as follows:

$$D_1=|E_1(\omega)|^2+|E_2(\omega-\Omega)|^2+2|E_1(\omega)E_2(\omega-\Omega)|\cos[\omega\tau+\psi(\omega)-\omega(\omega-\Omega)]$$

wherein, E represents electric field, $\tau$ represents the time delay between the first sum-frequency pulse and the second sum-frequency pulse, $\Omega$ represents the central frequency difference between the first sum-frequency pulse and the second sum-frequency pulse, and $\psi$ represents phase.

Accordingly, the calculation formula for the second spectral interference ring data $D_2$ measured by the spectrometer SP is as follows:

$$D_2=|E_1(\omega)|^2+|E_2(\omega-\Omega)|^2-2|E_1(\omega)E_2(\omega-\Omega)|\cos[\omega\tau+\psi(\omega)-\psi(\omega-\Omega)]$$

Then it is possible to calculate out the temporal (spectral) amplitude and phase of the ultra-short pulse laser by the two Fourier transformations with the calculation formula as follows:

$$D_1-D_2=4|E_1(\omega)E_2(\omega-\Omega)|\cos[\omega\tau+\psi(\omega)-\psi(\omega-\Omega)]$$

In the simulation experiment of the present embodiment, when the pulse to be measured is about 10 femtoseconds, the beam splitter BS splits the pulse to be measured into two beams. The reflected pulse is output to the pulse retarder DL that outputs it to the birefringent crystal BC and the broadband quarter-wave plate BQW. The reflected pulse then passes a polarizing beam splitter PL and is focused onto the sum-frequency pulse generator SHG by the focusing lens L. While the transmitted pulse is incident to the pulse disperser PD and spread by the pulse disperser into a chirped pulse with a width of about 5 picoseconds. The chirped pulse passes a half-wave plate HW and is reflected by the polarizing beam splitter PL, and then is focused by the focusing lens L onto the sum-frequency pulse generator SHG In the present experiment, the sum-frequency pulse generator SHG is a nonlinear mixing crystal which is a β-BBO crystal with a thickness of about tens of micrometers and may adopt the first class of phase matching and may also adopt the second class of phase matching. The first and second sum-frequency pulses have similar spectral shapes with the central frequencies offset by about 2.5 nanometers. Finally, the first and second sum-frequency pulses are received by the spectrometer SP. Upon measurement, the broadband quarter-wave plate BQW is adjusted such that the polarization direction of its incident pulses is parallel to the fast axis of the BQW, the spectrometer SP records the first spectral interference ring data; then the broadband quarter-wave plate BQW is rotated by 90°, and the spectrometer SP records again the second spectral interference ring data. In the present experiment, the spectrometer SP is a fiber spectrometer with a spectral resolution of about 0.02 nanometer.

In summary, in the device provided in the first embodiment of the present application, the optical element for generating the pulse pair to be measured consists of only a birefringent crystal and the adjustment of two-step phase shift is also achieved by only one broadband quarter-wave plate. In addition, the pulse disperser for generating chirped pulses also consists of two isosceles right-angle prisms, which makes its structure compact. Therefore, wide application of optical elements such as pulse stretchers, retarders, optical splitters and mirrors as in prior art devices is avoided, thereby significantly simplifying the device's overall structure and resulting in enhanced stability and compactness at the same time.

The second embodiment of the present application provides a spectral phase interference measurement system including all elements contained in the above-described spectral phase interference device and having the functions of the above-described spectral phase interference device, which will not be described in detail herein.

What have been described above are merely preferred embodiments of the present application rather than limiting the invention. Any modifications, equivalent substitutions and improvements made in the spirit and principle of the present application should be included in the scope of the present application.

The invention claimed is:

1. A spectral phase interference device, wherein said device comprises:
a beam splitter configured to split a pulse to be measured into a reflected pulse and a transmitted pulse, wherein said reflected pulse is incident to a pulse retarder and said transmitted pulse is incident to a pulse disperser;
said pulse disperser is configured to spread said transmitted pulse into a chirped pulse that is incident to a half-wave plate;
said half-wave plate is configured to adjust a polarization direction of said chirped pulse that is incident to a polarizing beam splitter after transmitting through said half-wave plate;
said pulse retarder is configured to delay said reflected pulse, wherein the delayed reflected pulse is incident to a birefringent crystal;
said birefringent crystal is configured to allow said delayed reflected pulse to generate a pulse pair to be measured with a relative time delay, wherein said pulse pair to be measured is incident to a broadband quarter-wave plate;
said broadband quarter-wave plate is configured to adjust said pulse pair to be measured to allow a phase difference p between relative phases of the two sub-pulses in said pulse pair to be measured to be generated, wherein said pulse pair to be measured which has phase difference π is incident to said polarizing beam splitter;
said polarizing beam splitter is configured to allow said pulse pair to be measured which has phase difference π and said chirped pulse that has transmitted through said half-wave plate to be incident to a focusing lens at the same time;
said focusing lens is configured to focus the chirped pulse that is transmitted through said half-wave plate and said pulse pair to be measured that has generated the phase difference π, wherein said focused pulse is incident to a sum-frequency pulse generator;
said sum-frequency pulse generator is configured to apply sum-frequency conversion to said focused pulse, to generate a sum-frequency pulse pair that is incident to a spectrometer; and said spectrometer is configured to record spectral interference ring data generated by said sum-frequency pulse pair.

2. The device of claim 1, wherein:
said pulse retarder consists of two 180° catadioptric mirror sets each containing two isosceles right-angle prisms, respectively, wherein said isosceles right-angle prism has each of its hypotenuse surfaces coated with 45° highly reflective coating;
and
in each of said 180° catadioptric mirror sets, one surface adjacent to the right angle of one isosceles right-angle prism and one surface adjacent to the right angle of the other isosceles right-angle prism are attached on the same reference plane, and the hypotenuse surfaces of the two isosceles right-angle prisms are opposed to each other.

3. The device of claim 1, wherein:
an optical axis direction of said birefringent crystal is in the same plane as a transmission direction of said delayed reflected pulse and forms a 45° angle with a polarization direction of said incident delayed reflected pulse, and incident and exit surfaces of said birefringent crystal are both coated with a broadband antireflection coating.

4. The device of claim 1, wherein:
said broadband quarter-wave plate is a broadband zero-order de-dispersion wave plate, with its fast and slow axes direction forming a 45° angle with a transmission direction of the incident pulse pair to be measured.

5. The device of claim 1, wherein:
said pulse disperser consists of a first isosceles right-angle prism and a second isosceles right-angle prism both of which are coated with antireflection coating on their hypotenuse surfaces.

6. The device of claim 1, wherein:
said polarizing beam splitter is a film splitter, with a normal line direction being in the same plane as the transmission direction of said incident pulse pair to be measured and being perpendicular to a polarization direction of said incident pulse pair to be measured.

7. The device of claim 1, wherein said polarizing beam splitter is specifically configured to reflect sub-pulses with vertical polarization direction in said pulse pair to be measured to said focusing lens, and transmit the chirped pulses that have transmitted through said half-wave plate to said focusing lens.

8. The device of claim 1, wherein:
said spectrometer is configured to record first spectral interference ring data when a fast axis direction of said broadband quarter-wave plate forms a 45° angle with a polarization direction of said incident pulse pair to be measured; and said spectrometer is configured to record second spectral interference ring data when a fast axis direction of said broadband quarter-wave plate forms a negative 45° angle with a polarization direction of said incident pulse pair to be measured.

9. A spectral phase interference system wherein said system comprises the spectral phase interference device of claim 1.

* * * * *